No. 705,219. Patented July 22, 1902.
J. DEMPSTER & W. S. BRADLEY.
CHURN.
(Application filed Nov. 4, 1901.)
(No Model.)
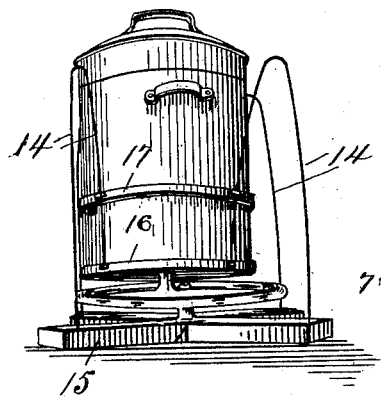
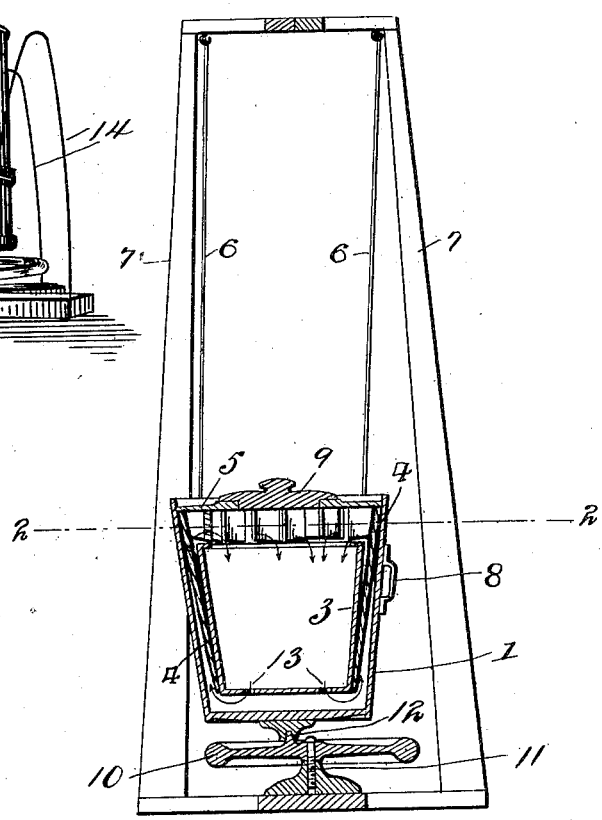
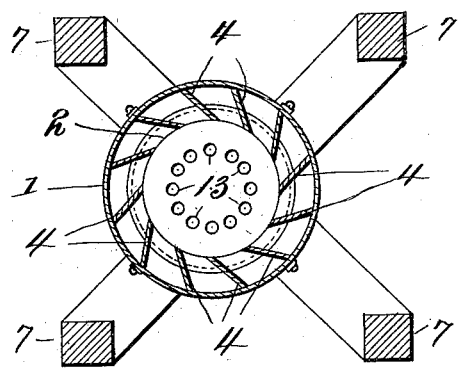
Witnesses.
Chas. K. Davies.
Inventors.
John Dempster
and William S. Bradley
by
Attorney.

UNITED STATES PATENT OFFICE.

JOHN DEMPSTER AND WILLIAM S. BRADLEY, OF KNOXVILLE, TENNESSEE.

CHURN.

SPECIFICATION forming part of Letters Patent No. 705,219, dated July 22, 1902.

Application filed November 4, 1901. Serial No. 81,135. (No model.)

*To all whom it may concern:*

Be it known that we, JOHN DEMPSTER and WILLIAM S. BRADLEY, residents of Knoxville, Tennessee, have invented a new and useful Improvement in Churns, which invention is fully set forth in the following specification.

Our invention relates to churns, and has for its object to provide a churn that can be easily operated and which shall at the completion of the operation present the butter in a receptacle separated from the buttermilk.

With these objects in view the invention consists in a vessel, preferably of an inverted-frusto-conical shape, having a second similarly-shaped vessel of smaller dimensions suspended therein, the latter vessel being perforated at the bottom and having outwardly-flaring blades or flanges at its top. The outer vessel is tightly covered and suspended to any suitable support and is pivotally connected at its bottom to a horizontally-mounted wheel or disk, the pivotal point of connection being eccentric to the wheel. The churn thus constructed is operated by grasping a handle on the side of the churn and swinging the churn in a circle, but without revolving it on its own axis.

The invention will be best understood by reference to the accompanying drawings, in which—

Figure 1 is a vertical central cross-section of our churn, showing it suspended from a suitable framework. Fig. 2 is a horizontal cross-section on the line 2 2; and Fig. 3 is a perspective view of a modification of our invention.

Referring to the drawings, 1 is any suitable vessel, preferably of greater diameter at the top than at the bottom, and 3 is a second vessel of similar shape, but smaller dimensions, suspended within the vessel 1. Any suitable means for suspending the vessel 3 within the vessel 1 may be employed, and, as here shown, this is accomplished by means of a series of wings or blades 4, secured at proper intervals to vessel 3 and projecting outward therefrom on nearly tangential lines. These wings or blades 4 fit snugly within the vessel 1 at their outer ends and by reason of the tapering sides of the vessel 1 serve to suspend the vessel 3 therein. Such vessel 3 might, however, be suspended in any preferred manner from the cover 5 of the vessel 1, and the blades 4 might, if preferred, be likewise secured to said cover. The vessel 1 is suspended by cords 6 or other suitable means to any convenient support, here shown as a frame 7, and is provided with a handle 8, while the cover 5 is provided with a central opening closed by a cover 9. A wheel or disk 10 is adapted to turn on its axis 11 and is pivotally connected to the vessel 1 at a point 12 eccentric to the wheel or disk 10. The bottom of the vessel 3 is perforated, as at 13, so that milk poured into the vessel 3 passes freely into the vessel 1.

The operation of the device is as follows: The cover 9 is removed and milk is poured into the vessel 3 and the cover 9 replaced. The milk rises to an equal height in both vessels. The operator thereupon grasps the handle 8 and moves the churn around the axis of the wheel or disk 10, but without turning the churn around its own axis. This motion causes the milk to rise into the space between the walls of the two vessels and pass between the wings or flanges 4 into the vessel 3. After this has been continued for a sufficient length of time it will be found that the butter which has been churned is all gathered within the inner vessel 3, and upon lifting said vessel out of vessel 1 the buttermilk will flow out of the bottom perforations 13 and leave the completely-separated butter in vessel 3. Experience has demonstrated that butter may be quickly churned in this churn and that the trouble of "gathering" the butter heretofore experienced in some classes of churns is entirely avoided.

In the modification shown in Fig. 3, 14 represents rods of steel or other flexible elastic material projecting upward from the base 15, of any suitable construction, and then inward and downward, where they are attached to a disk 16, which may be a part of the churn proper or a disk on which the churn rests, and preferably a hoop 17 is also secured to the rods 14 at a point above the disk 16. It will be understood that if the disk 16 and hoop 17 are separate from the churn-body the latter can readily be placed in position on or removed from the support, as desired.

The wheel 10 is a momentum or balance wheel, the revolution of which imparts regularity and steadiness to the gyrations of the churn-body. The omission of the balance-wheel would result in an irregular gyratory motion and reversal of the direction of motion, either of which would cause the flow of milk and cream in its circulatory movement through the double vessels to be diverted and reversed. The motion is from right to left. As the milk rises in the outer vessel the inclined deflectors 4 force the contents over and into the inner vessel and materially assist in the circulation.

It will be noted that when the balance-wheel is once put in motion it is only necessary to take one of the handles of the churn-body and pull in to and push it from the operator, the momentum of the wheel maintaining the regular circulatory gyrations of the churn-body.

Having thus described the invention, what is claimed is—

1. In a churn, the combination of an outer movable churn-body provided with inwardly-projecting blades, a second vessel suspended therein, revolving therewith and having a perforated bottom, means suspending said churn-body from a support, and a horizontally-revoluble balance or momentum wheel or disk below the churn-body and pivoted thereto at a point eccentric to said wheel or disk.

2. In a churn, the combination of an outer vessel, an inner vessel suspended therein and having a perforated bottom, approximately tangential wings or blades projecting outward from the top of the inner vessel, and a balance or momentum wheel to which the churn-body is eccentrically pivoted.

3. A churn-body, flexible rods supporting said body and a horizontally-revoluble balance or momentum wheel to which said churn-body is eccentrically connected.

4. A churn-body, a plurality of flexible rods projecting upward from a suitable base and then inward and downward, a balance or momentum wheel to which the body is eccentrically pivoted, and means securing said rods to said body, whereby they serve as a support therefor.

5. In a churn, the combination of an outer movable vessel or body, greater in diameter at the top than at its base and provided with inwardly-deflecting blades, a second vessel interposed in said outer vessel, revolving therewith and having perforations at its bottom, means for supporting said churn, a horizontal momentum-wheel, and means connecting said churn-body and wheel eccentric to the axis of said wheel.

6. In a churn, the combination of an outer vessel or churn-body, greater in diameter at the top than at the bottom, a second vessel interposed therein, stationary with respect to said outer vessel or body, removable therefrom, and provided with perforations or openings at or near its bottom, and with diverter blades or wings at its top, means flexibly supporting said churn-body, and a horizontal momentum or balance wheel eccentrically connected to said churn-body.

In testimony whereof we have signed this specification in the presence of two subscribing witnesses.

JOHN DEMPSTER.
WILLIAM S. BRADLEY.

Witnesses:
J. H. WELCKER,
E. S. PARKER, Jr.